US009716459B2

(12) United States Patent
Hanaka et al.

(10) Patent No.: US 9,716,459 B2
(45) Date of Patent: Jul. 25, 2017

(54) MOBILE BODY, MOBILE BODY SYSTEM, AND POSITION DETECTING METHOD FOR MOBILE BODY

(71) Applicant: Murata Machinery, Ltd., Kyoto-shi, Kyoto (JP)

(72) Inventors: Satoshi Hanaka, Inuyama (JP); Yasutake Yamada, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 15/221,451

(22) Filed: Jul. 27, 2016

(65) Prior Publication Data

US 2017/0054397 A1 Feb. 23, 2017

(30) Foreign Application Priority Data

Aug. 21, 2015 (JP) .................... 2015-163938

(51) Int. Cl.
| | |
|---|---|
| *H02K 29/08* | (2006.01) |
| *H02P 25/06* | (2016.01) |
| *H02K 11/215* | (2016.01) |
| *H02K 41/02* | (2006.01) |
| *G01D 5/14* | (2006.01) |

(52) U.S. Cl.
CPC .............. *H02P 25/06* (2013.01); *G01D 5/145* (2013.01); *H02K 11/215* (2016.01); *H02K 41/02* (2013.01)

(58) Field of Classification Search
CPC ...... G05B 11/01; H02K 41/02; H02K 41/025; H02K 21/00; H02K 21/14; H02K 29/06; H02K 29/08; H02P 6/00; H02P 6/14; H02P 21/00

USPC .......... 318/119, 135, 400.01, 400.4, 400.02, 318/400.14, 700, 701, 727, 779, 799, 800, 318/801, 430, 432, 437; 388/800, 901, 388/909, 931; 324/207.13, 207.23, 324/207.24
See application file for complete search history.

(56) References Cited

U.S. PATENT DOCUMENTS 5,175,479 A * 12/1992 Tajima .................. G05B 13/024
318/560
2016/0072367 A1    3/2016 Yamada et al.

FOREIGN PATENT DOCUMENTS

JP            04-285407 A      10/1992

* cited by examiner

*Primary Examiner* — Antony M Paul
(74) *Attorney, Agent, or Firm* — DLA PIPER LLP (US)

(57) ABSTRACT

A mobile body moves along a magnetic pole path. The magnetic pole path includes a first magnetic pole section and a second magnetic pole section. The mobile body includes a detector, a rate changing unit, and a position specifying unit. The detector detects a phase angle in accordance with a magnetic flux of the magnetic pole path. The rate changing unit changes a position conversion rate obtained by associating a phase angle of the magnetic pole path with a position of the magnetic pole path based on the phase angle detected by the detector. The position specifying unit specifies a position of the mobile body along the magnetic pole path based on the phase angle detected by the detector and the position conversion rate changed by the rate changing unit.

19 Claims, 8 Drawing Sheets

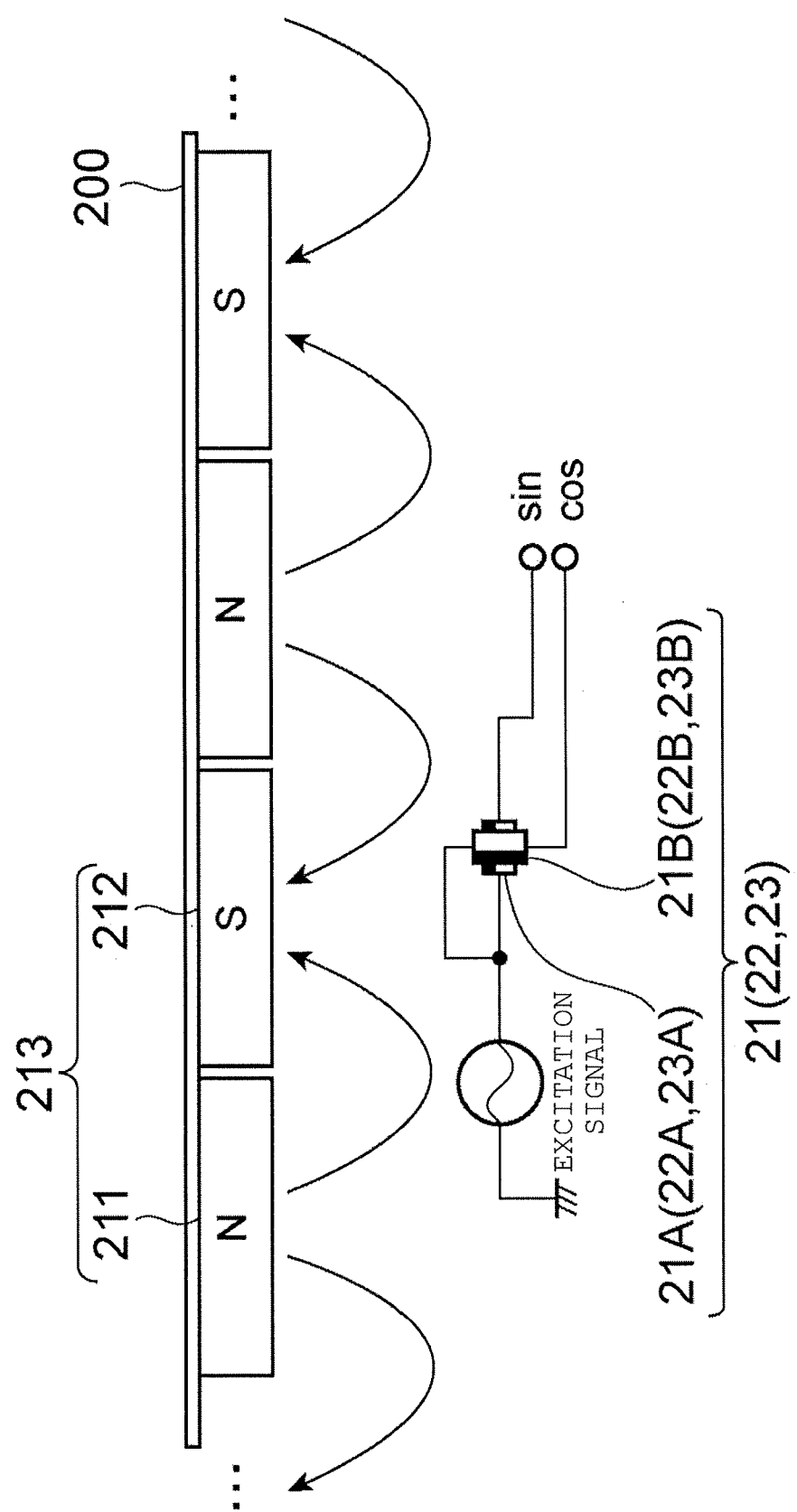

MOBILE BODY, MOBILE BODY SYSTEM, AND POSITION DETECTING METHOD FOR MOBILE BODY

CROSS-REFERENCE TO RELATED APPLICATIONS

This application claims priority under 35 U.S.C. 119 to Japanese Patent Application No. 2015-163938, filed on Aug. 21, 2015, which application is hereby incorporated by reference in its entirety.

BACKGROUND OF THE INVENTION

1. Field of the Invention

The present invention relates to a mobile body that moves along a magnetic pole path in which a plurality of pairs of magnetic poles, each including a north pole and a south pole, are arranged, by using a linear motor. The present invention also relates to a mobile body system and a position detecting method for the mobile body.

2. Description of the Related Art

There has been generally known a mobile body system including a mobile body having a linear motor and a magnetic pole path in which a plurality of pairs of magnetic poles, each including a north pole and a south pole, are arranged. In the mobile body system, the linear motor is driven by a magnetic interaction with a magnetic flux of the magnetic pole path, and the mobile body thereby moves along the magnetic pole path.

In the mobile body system, a length of the magnetic pole path variously changes depending on a factory layout, for example, and hence it may be difficult to unify a pitch length of the magnetic pole path (a length of a pitch when a pair of magnetic poles is taken as one pitch) to a prescribed pitch length. In such a case, the magnetic pole path includes a section having a different pitch length from the prescribed pitch length, and thus includes a plurality of kinds of pitch lengths in a mixed state.

However, in the mobile body system, on the assumption that the pitch length of the magnetic pole path is made uniform to the prescribed pitch length, the mobile body detects a phase angle in accordance with the magnetic flux of the magnetic pole path by using a magnetic sensor and converts the phase angle to an actual position of the magnetic pole path. Therefore, when the magnetic pole path includes a plurality of kinds of pitch lengths in a mixed state, the mobile body is unable to detect the position of the mobile body with high accuracy in the section having a different pitch length from the prescribed pitch length.

BRIEF SUMMARY OF THE INVENTION

Accordingly, it is an object of the present invention to provide a mobile body, a mobile body system, and a position detecting method for the mobile body in which a position of a mobile body can be detected with high accuracy even when a pitch length of a magnetic pole path is changed.

According to a first aspect, the present invention is configured as follows. The mobile body moves along the magnetic pole path. The magnetic pole path includes a first magnetic pole section and a second magnetic pole section. The first magnetic pole section is a section in which a plurality of pairs of magnetic poles, each including a north pole and a south pole, are arranged with a first pitch length, and the second magnetic pole section is a section in which a plurality of pairs of magnetic poles, each including a north pole and a south pole, are arranged with a second pitch length that is different from the first pitch length. Further, the mobile body includes a detector, a rate changing unit, and a position specifying unit. The detector detects a phase angle in accordance with a magnetic flux of the magnetic pole path. The rate changing unit changes a position conversion rate obtained by associating a phase angle of the magnetic pole path with a position of the magnetic pole path based on the phase angle detected by the detector. The position specifying unit specifies a position of the mobile body along the magnetic pole path based on the phase angle detected by the detector and the position conversion rate changed by the rate changing unit.

According to a second aspect, the present invention is configured as follows. The mobile body system includes a magnetic pole path, a mobile body, a detector, a rate changing unit, and a position specifying unit. The magnetic pole path includes a first magnetic pole section and a second magnetic pole section. The first magnetic pole section is a section in which a plurality of pairs of magnetic poles, each including a north pole and a south pole, are arranged with a first pitch length, and the second magnetic pole section is a section in which a plurality of pairs of magnetic poles, each including a north pole and a south pole, are arranged with a second pitch length that is different from the first pitch length. The detector is provided in the mobile body and detects a phase angle in accordance with a magnetic flux of the magnetic pole path. The rate changing unit changes a position conversion rate obtained by associating a phase angle of the magnetic flux density path with a position of the magnetic pole path based on the phase angle detected by the detector. The position specifying unit specifies a position of the mobile body along the magnetic pole path based on the phase angle detected by the detector and the position conversion rate changed by the rate changing unit.

According to a third aspect, the present invention is configured as follows. A position detecting method for a mobile body is a position detecting method for a mobile body that moves along a magnetic pole path including a first magnetic pole section in which a plurality of pairs of magnetic poles, each including a north pole and a south pole, are arranged with a first pitch length, and a second magnetic pole section in which a plurality of pairs of magnetic poles, each including a north pole and a south pole, are arranged with a second pitch length that is different from the first pitch length. The position detecting method for the mobile body includes a detection step, a rate changing step, and a position specifying step. In the detection step, a phase angle is detected in accordance with a magnetic flux of the magnetic pole path. In the rate changing step, a position conversion rate, obtained by associating a phase angle of the magnetic pole path with a position of the magnetic pole path, is changed based on the phase angle detected in the detection step. In the position specifying step, a position of the mobile body along the magnetic pole path is specified based on the phase angle detected in the detection step and the position conversion rate changed in the rate changing step.

According to the mobile body, the mobile body system, and the position detecting method for the mobile body described above, even when a change occurs in pitch length of the magnetic pole path, the position of the mobile body can be detected with high accuracy by changing the position conversion rate for specifying the position.

Further, the present invention is preferably configured as follows. The detector includes a first detector which detects a first phase angle in accordance with the magnetic flux of the magnetic pole path, and a second detector which is disposed in a position different from a position of the first detector in a path direction of the magnetic pole path and detects a second phase angle in accordance with the magnetic flux of the magnetic pole path. The rate changing unit changes the position conversion rate based on a phase difference between the first phase angle and the second phase angle.

Thus, since actual detected values obtained from the two detectors are compared, it is possible to grasp a change in pitch length of the magnetic pole path with high accuracy, and adjust the position conversion rate with high accuracy.

Further, the present invention is preferably configured as follows. The first detector includes at least two magnetic elements and detects the first phase angle based on the at least two magnetic elements. The second detector includes at least two magnetic elements and detects the second phase angle based on the at least two magnetic elements.

Thus, since actual detected values obtained from the plurality of magnetic elements are compared in each detector, it is possible to grasp a change in pitch length of the magnetic pole path with high accuracy, and adjust the position conversion rate with high accuracy.

Further, the present invention is preferably configured as follows. The first detector and the second detector are configured as different magnetic sensors from each other. Further, the first detector and the second detector are configured as the same magnetic sensor. When the first detector and the second detector are configured as the same magnetic sensor, one magnetic sensor can grasp the change in pitch length of the magnetic pole path to adjust the position conversion rate.

Further, the present invention is preferably configured as follows. The first detector includes a first magnetic element and a second magnetic element which have detection planes with different angles from each other by 90 degrees, and are disposed in substantially the same position in the magnetic sensor in the path direction of the magnetic pole path. The second detector includes a third magnetic element and a fourth magnetic element which have detection planes with different angles from each other by 90 degrees, and are disposed in substantially the same position in the magnetic sensor in the path direction of the magnetic pole path.

Thus, it is possible to hold the magnetic elements compactly in the same position in the sensor such that the detection planes are oriented in a vertical direction and a horizontal direction, for example.

Further, the present invention is preferably configured as follows. The mobile body further includes a storage unit for previously storing a reference phase difference. The rate changing unit changes the position conversion rate based on an amount of shift between the reference phase difference and the phase difference of the first phase angle and the second phase angle.

Thus, since the comparison is made with the reference phase difference being a fixed value, it is possible to grasp the change in pitch length of the magnetic pole path and adjust the position conversion rate not only in a transition period between the first magnetic pole section and the second magnetic pole section but also during the time of detection by both the first detector and the second detector in the first magnetic pole section or the second magnetic pole section.

Further, the present invention is preferably configured as follows. The reference phase difference is a phase difference between phase angles detected respectively by the first detector and the second detector in the first magnetic pole section.

Further, the present invention is preferably configured as follows. That is, the rate changing unit changes the position conversion rate based on a difference between a displacement amount of the first phase angle and a displacement amount of the second phase angle.

Thus, it is possible to grasp the change in pitch length of the magnetic pole path and adjust the position conversion rate in the transition period between the first magnetic pole section and the second magnetic pole section without previously storing the reference phase difference.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram illustrating a magnetic pole sensor that includes two Hall elements having detection planes with different angles from each other by 90 degrees;

DETAILED DESCRIPTION OF PREFERRED EMBODIMENTS

Figure 1:
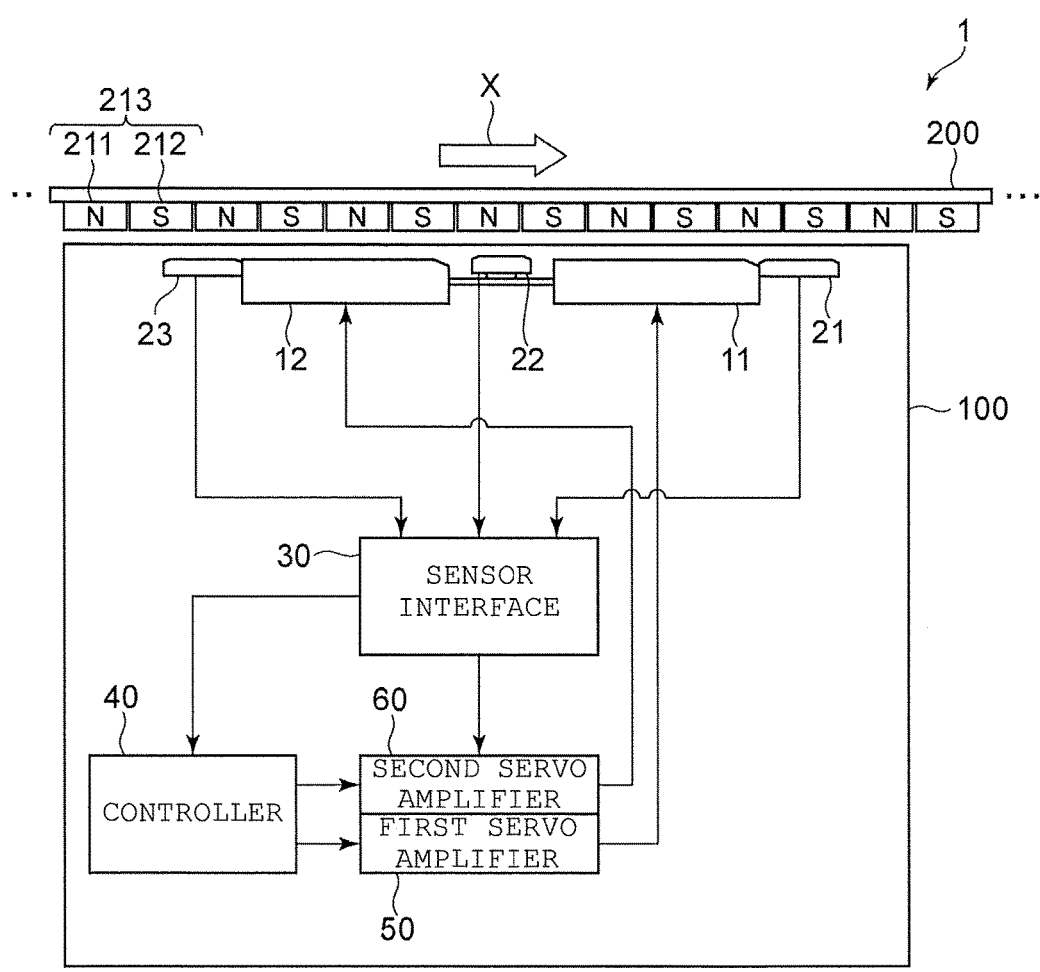
FIG. 1 is a diagram illustrating a mobile body system according to one embodiment and a mobile body according to one embodiment of the present invention.

Hereinafter, preferred embodiments of the present invention will be described in detail with reference to the drawings. The same reference numerals are denoted on the same or corresponding portions throughout the drawings.

First Embodiment

1. Configuration of Mobile Body System 1

FIG. 1 is a diagram illustrating a mobile body system 1 according to one embodiment and a mobile body 100 according to one embodiment of the present invention. The mobile body system 1 illustrated in FIG. 1 includes the mobile body 100 and a magnetic pole path 200.

On the magnetic pole path 200, north pole magnets 211 and south pole magnets 212 are alternately disposed at a predetermined pitch (e.g., 33 mm) in a line. In other words, a plurality of pairs of magnetic poles 213, each including a north pole and a south pole, are arranged in the magnetic pole path 200. The mobile body 100 moves along the magnetic pole path 200 by using a linear motor.

One example of the mobile body system 1 is an overhead travelling vehicle system in which a transport vehicle (mobile body) 100 travels along a rail (magnetic pole path) 200 installed on the ceiling. In this kind of mobile body system 1, the rail 200 may have a length of several km, and the number of transport vehicles 100 may be 300 to 400. The mobile body may be a transport vehicle travelling on the ground, or may not be a transport vehicle. For example, the mobile body may be any vehicle other than the transport vehicle, a robot arm, or the like.

Figure 3:
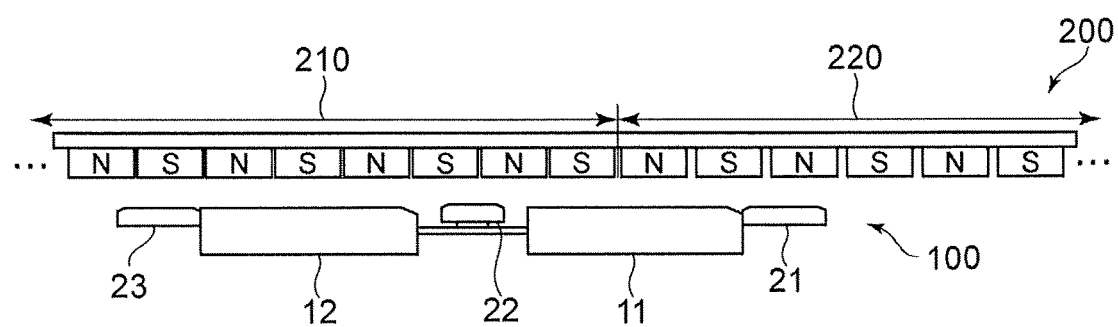
FIG. 3 is a diagram illustrating a main part of the mobile body that moves in magnetic pole sections having different pitch lengths.

In this kind of mobile body system 1, the length of the magnetic pole path variously changes depending on a factory layout, for example. It is thereby difficult to unify a pitch length of the magnetic pole path, with a pair of magnetic poles taken as one pitch, to a prescribed pitch length. Further, since an error occurs in size of the magnetic pole, it may be difficult to unify the pitch length of the magnetic pole path to a prescribed pitch length that satisfies required accuracy. For these reasons, this kind of magnetic pole path may include a section having a different pitch length from the prescribed pitch length. In the present embodiment, as illustrated in FIG. 3, the magnetic pole path 200 includes a first magnetic pole section 210 in which a plurality of pairs of magnetic poles 213 are arranged with a first pitch length (prescribed pitch length: e.g., 66 mm), and a second magnetic pole section 220 in which a plurality of pairs of magnetic poles 213 are arranged with a second pitch length (e.g., 65 mm) different from the first pitch length. Further, in addition to the first magnetic pole section 210 and the second magnetic pole section 220, the magnetic pole path 200 includes a magnetic pole missing section in which the magnetic pole is missing.

2. Configuration of Mobile Body 100

Figure 2:
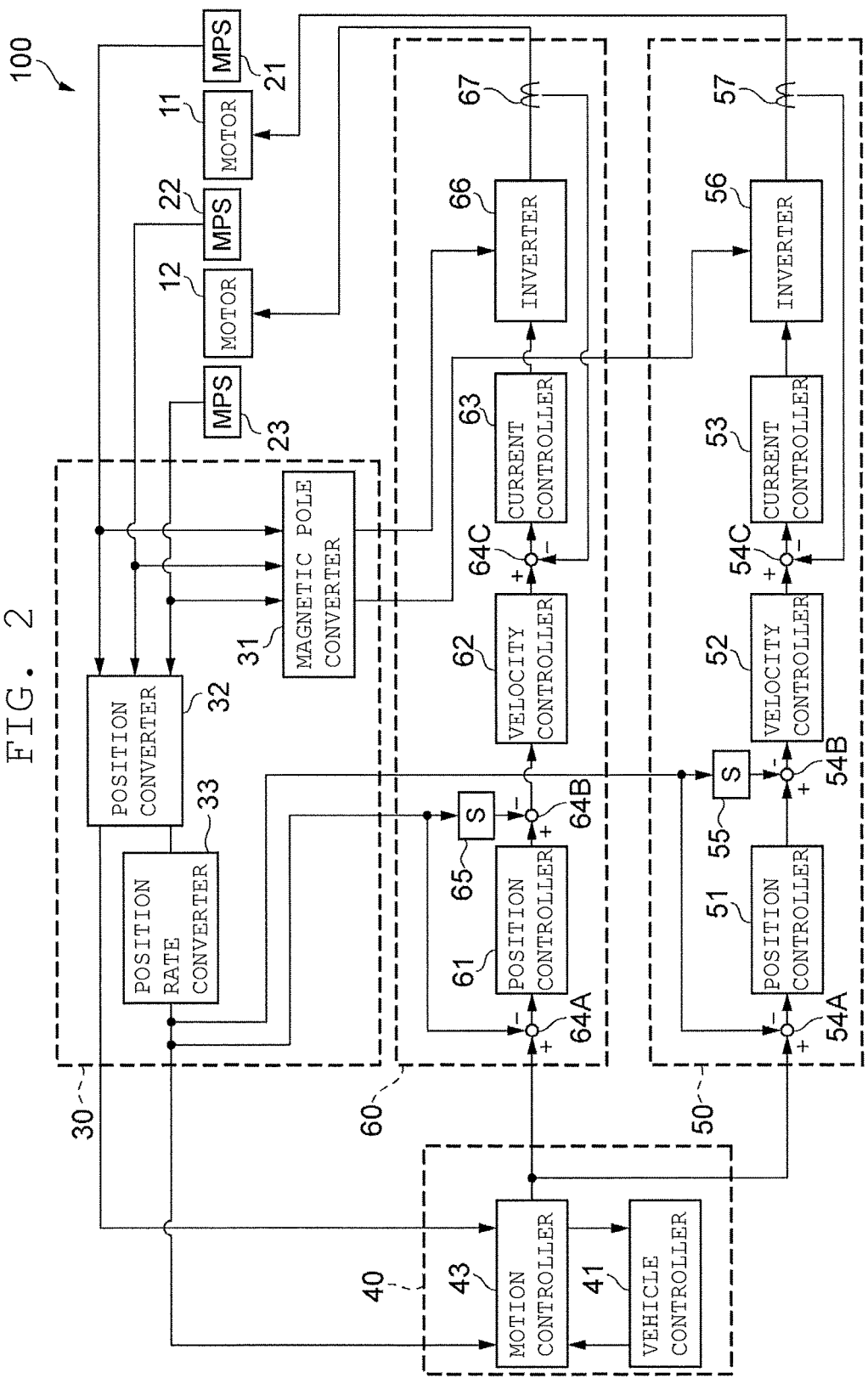
FIG. 2 is a diagram illustrating the mobile body in the mobile body system illustrated in FIG. 1.

FIG. 2 is a diagram illustrating the mobile body 100 in the mobile body system 1 illustrated in FIG. 1. The mobile body 100 illustrated in FIGS. 1 and 2 includes first and second linear motors 11, 12, first, second, and third magnetic pole sensors 21, 22, 23, a sensor interface 30, a controller 40, and first and second servo amplifiers 50, 60. In the present embodiment, the first magnetic pole sensor 21, the first linear motor 11, the second magnetic pole sensor 22, the second linear motor 12, and the third magnetic pole sensor 23 are disposed sequentially from the upstream side of a moving direction X of the mobile body. In the present embodiment, the first and second magnetic pole sensors 21, 22 respectively correspond to the first and second detectors in the claims. Further, the third and second magnetic pole sensors 23, 22 respectively correspond to the first and second detectors in the claims.

3. Configurations of First and Second Linear Motors 11, 12

Each of the first linear motor 11 and the second linear motor 12 is a three-phase linear motor, for example, and is driven by a magnetic interaction with the magnetic flux of the magnetic pole path 200. A magnetic field of the first linear motor 11 is controlled by an AC drive current from the first servo amplifier 50, and a magnetic field of the second linear motor 12 is controlled by an AC drive current from the second servo amplifier 60. The first linear motor 11 and the second linear motor 12 are disposed in different positions in the moving direction X of the mobile body 100 (a path direction of the magnetic pole path 200).

4. Configurations of First to Third Magnetic Pole Sensors 21, 22, 23

The first magnetic pole sensor 21 is a magnetic pole sensor (MPS) for detecting the magnetic pole of the magnetic pole path 200, and includes two Hall elements (magnetic elements) 21A, 21B, for example. As illustrated in FIG. 4, these two Hall elements 21A, 21B have detection planes with different angles from each other by 90 degrees, and are disposed in substantially the same position in the first magnetic pole sensor 21 in the path direction X of the magnetic pole path 200. With such a configuration, based on outputs of these two Hall elements 21A, 21B, the first magnetic pole sensor 21 detects a phase angle (a first phase angle) in accordance with the magnetic flux of the magnetic pole path 200, with a pair of magnetic poles 213 including the north pole and the south pole taken as one cycle. Since the phase angle detected by this magnetic pole sensor is used for an electrical angle of the first linear motor 11 as described later, this magnetic pole sensor is referred to as a first electrical angle detecting sensor.

Similarly, the third magnetic pole sensor 23 is a magnetic pole sensor (MPS) for detecting the magnetic pole of the magnetic pole path 200, and includes two Hall elements (magnetic elements) 23A, 23B, for example. As illustrated in FIG. 4, these two Hall elements 23A, 23B have detection planes with different angles from each other by 90 degrees, and are disposed in substantially the same position in the third magnetic pole sensor 23 in the path direction X of the magnetic pole path 200. With such a configuration, based on outputs of these two Hall elements 23A, 23B, the third magnetic pole sensor 23 detects a phase angle (a first phase angle) in accordance with the magnetic flux of the magnetic pole path 200, with a pair of magnetic poles 213 including the north pole and south pole taken as one cycle. Since the phase angle detected by this magnetic pole sensor is used for an electrical angle of the second linear motor 12 as described later, this magnetic pole sensor is referred to as a second electrical angle detecting sensor.

The second magnetic pole sensor 22 is a magnetic pole sensor (MPS) for detecting the magnetic pole of the magnetic pole path 200, and includes two Hall elements (magnetic elements) 22A, 22B, for example. As illustrated in FIG. 4, these two Hall elements 22A, 22B have detection planes with different angles from each other by 90 degrees, and are disposed in substantially the same position in the second magnetic pole sensor 22 in the path direction X of the magnetic pole path 200. With such a configuration, based on outputs of these two Hall elements 22A, 22B, the second magnetic pole sensor 22 detects a phase angle (a second phase angle) in accordance with the magnetic flux of the magnetic pole path 200, with a pair of magnetic poles 213 including the north pole and the south pole taken as one cycle. Since the phase angle detected by this magnetic pole sensor is used for detecting the position of the mobile body 100 as described later, this magnetic pole sensor is referred to as a position detecting sensor.

The first, second, and third magnetic pole sensors 21, 22, 23 each have a function of determining whether or not it is located in the magnetic pole missing section based on the detected magnetic flux of the magnetic pole path 200. When it is not located in the magnetic pole missing section, each of the first, second, and third magnetic pole sensors 21, 22, 23 outputs a signal (validation) indicating that the output is in a valid state. When it is located in the magnetic pole missing section, each of the first, second, and third magnetic pole sensors 21, 22, 23 outputs a signal (validation) indicating that the output is in an invalid state.

The first magnetic pole sensor 21, the second magnetic pole sensor 22, and the third magnetic pole sensor 23 are disposed in different positions in the moving direction X of the mobile body 100 (the path direction of the magnetic pole path 200). The first magnetic pole sensor 21 and the second magnetic pole sensor 22 are disposed so as to sandwich the first linear motor 11 in the moving direction X of the mobile body 100 (the path direction of the magnetic pole path 200). Further, the second magnetic pole sensor 22 and the third magnetic pole sensor 23 are disposed so as to sandwich the second linear motor 12 in the moving direction X of the mobile body 100 (the path direction of the magnetic pole path 200).

As thus described, in the present embodiment, one sensor for detecting the electrical angle of the linear motor is provided with respect to one linear motor, and one sensor for detecting the position of the mobile body is provided with respect to the mobile body.

Figure 8:
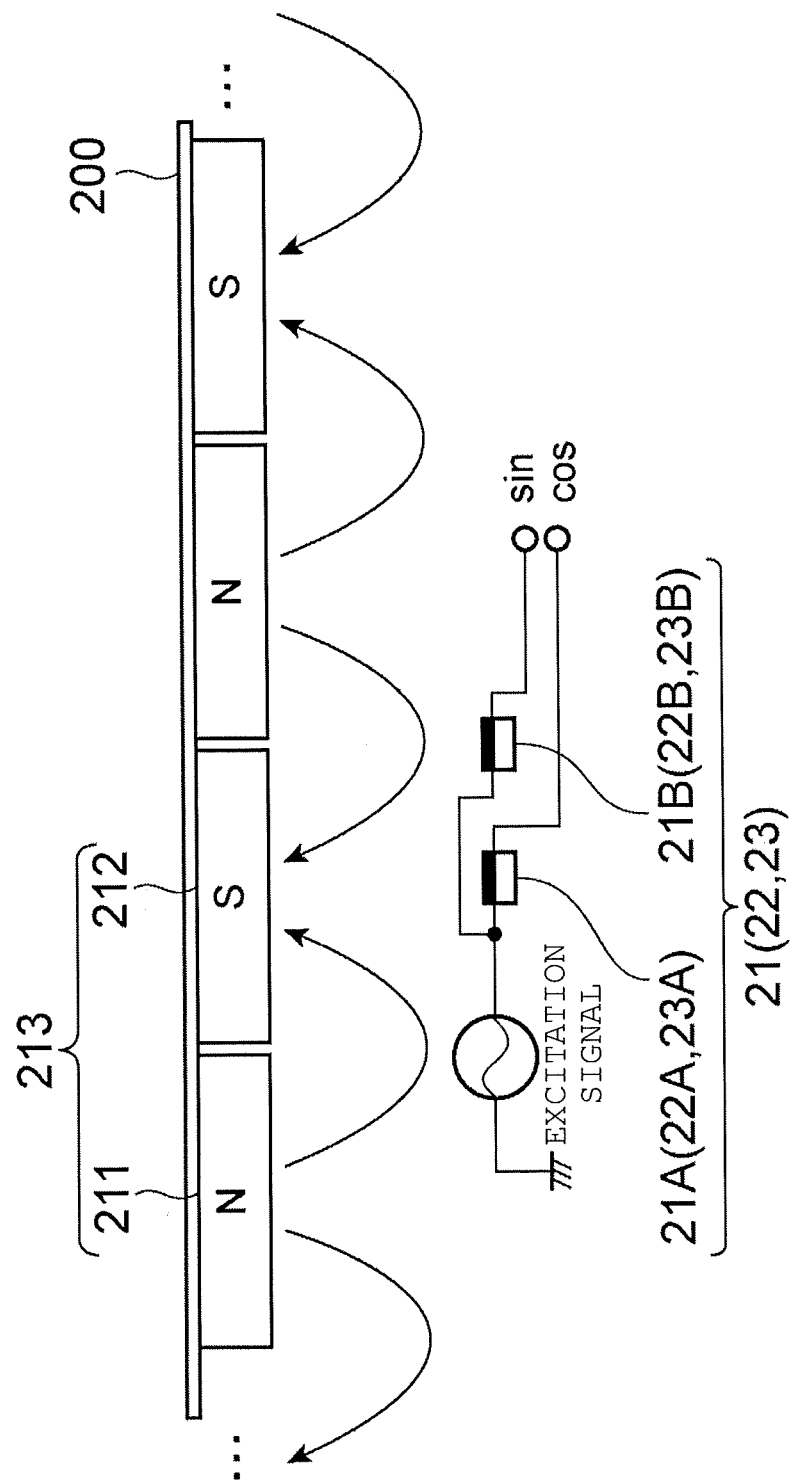
FIG. 8 is a diagram illustrating a magnetic pole sensor that includes two Hall elements having detection planes in the same direction.

In the conventional sensor 21 (22, 23), as illustrated in FIG. 8, two magnetic detection elements 21A, 21B (22A, 22B or 23A, 23B) made of coils, Hall elements, or the like are disposed so as to be shifted by a quarter of a magnetic pole pitch (one cycle) of a pair of magnetic poles 213 (90 degrees) in the path direction X of the magnetic pole path 200, to obtain a sin signal and a cos signal with phases shifted by 90 degrees. Thereafter, PD conversion processing is performed on these signals, or processing using a correspondence table for these signals is performed, to identify the magnetic pole. In this case, the magnetic detection elements have a large length in the path direction X of the magnetic pole path 200, and the arrangement thereof is thus restricted.

Figure 5A:
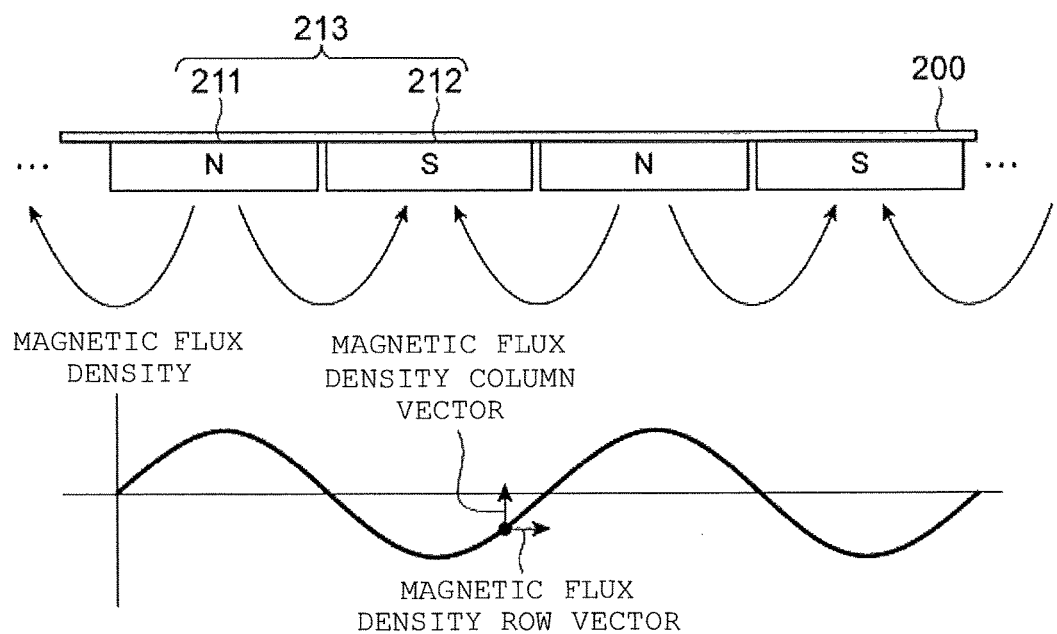
FIG. 5A is a diagram illustrating a detection principle of the two Hall elements illustrated in FIG. 4.
Figure 5B:
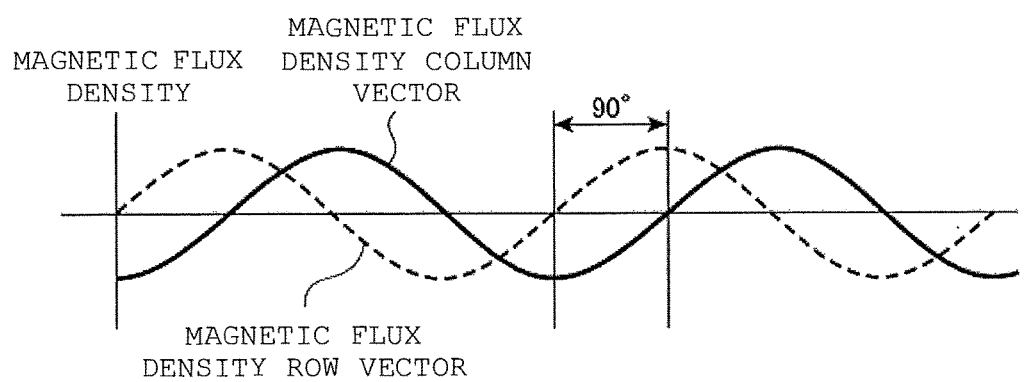
FIG. 5B is a diagram illustrating a detection principle of the two Hall elements illustrated in FIG. 4.
Figure 6:
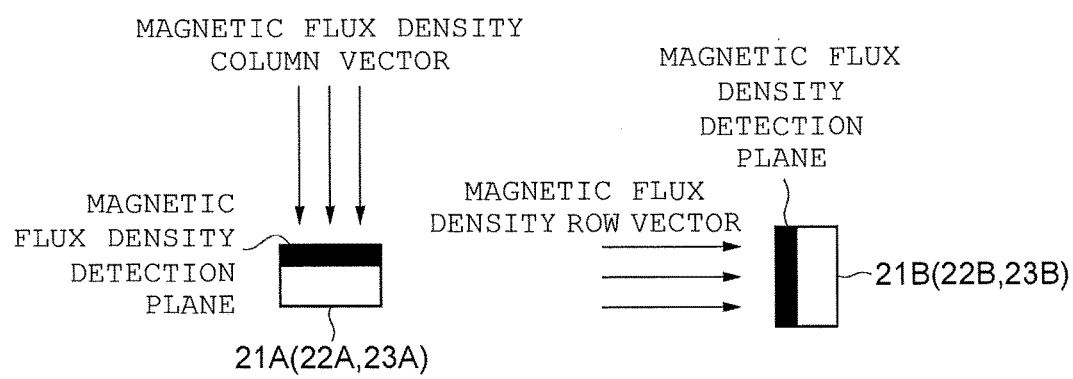
FIG. 6 is a diagram illustrating a detection principle of the two Hall elements illustrated in FIG. 4.

In this regard, the present inventors have found that a magnetic flux density illustrated in FIG. 5A can be resolved into a column vector and a row vector, and the column vector and the row vector are shifted by 90 degrees from each other as illustrated in FIG. 5B. A magnetic flux density detection plane is present in the magnetic detection element such as the Hall element. Thus, as illustrated in FIG. 6, the Hall elements 21A, 21B (22A, 22B or 23A, 23B) can respectively detect the column vector and the row vector of the magnetic flux density by being disposed such that the magnetic flux density detection planes have different angles from each other by 90 degrees. In this manner, even when the Hall elements 21A, 21B (22A, 22B or 23A, 23B) are disposed in substantially the same position, it is possible to obtain a sin signal and a cos signal having phases shifted by 90 degrees. Thereafter, signal processing such as PD conversion is performed by using the sin signal and the cos signal, to identify the magnetic pole (derive the phase angle of the magnetic pole).

In other words, in the conventional method, as illustrated in FIG. 8, the two magnetic detection elements 21A, 21B (22A, 22B or 23A, 23B) are disposed in the path direction X of the magnetic pole path 200 so as to be shifted by 90 degrees, and the magnetic flux density detection planes of the two magnetic detection elements 21A, 21B (22A, 22B or 23A, 23B) are disposed in parallel to the magnetic pole path 200. Thereby, in the conventional method, the two magnetic detection elements 21A, 21B (22A, 22B or 23A, 23B) detect the column vector of the magnetic flux density.

In contrast, in the present application, as illustrated in FIG. 4, the two magnetic detection elements 21A, 21B (22A, 22B or 23A, 23B) are disposed in substantially the same position in the path direction X of the magnetic pole path 200. The magnetic flux density detection plane of one of the magnetic detection elements 21A, 21B (22A, 22B or 23A, 23B) is disposed in parallel to the magnetic pole path. The magnetic flux density detection plane of the other of the magnetic detection elements is disposed at a right angle to the magnetic pole path 200. That is, the magnetic flux density detection planes of the two magnetic detection elements 21A, 21B (22A, 22B or 23A, 23B) are disposed different from each other by 90 degrees. Thereby, in the present application, the two magnetic detection elements 21A, 21B (22A, 22B or 23A, 23B) respectively detect the column vector and the row vector of the magnetic flux density.

Figure 7:
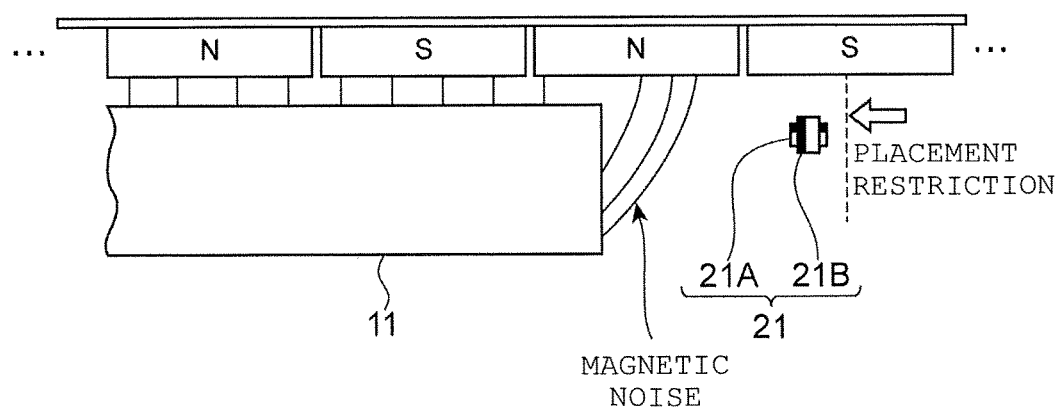
FIG. 7 is a diagram illustrating a detection principle of the two Hall elements illustrated in FIG. 4.

Meanwhile, as illustrated in FIG. 7, for example when the magnetic pole sensor 21 is disposed in the proximity of the first linear motor 11, the magnetic pole sensor 21 is affected by magnetic noise, because the first linear motor 11 generates magnetic noise when excited. It is thus necessary to dispose the magnetic pole sensor 21 apart from the first linear motor 11. However, disposing the magnetic pole sensor 21 apart from the first linear motor 11 in this manner increases a dead space, to cause an operational problem (such as arrangement restriction). In this regard, even when the magnetic pole sensor 21 of the present application is disposed offset with respect to the first linear motor 11, the dead space can be held at the minimum.

5. Configuration of Sensor Interface 30

The sensor interface 30 includes a magnetic pole converter 31, a position converter 32, and a position rate converter 33. The position rate converter 33 functions as a rate changing unit, a position specifying unit, and a storage unit described in the claims.

The magnetic pole converter 31 derives an electrical angle of the magnetic field of the first linear motor 11 (an electrical angle of a drive current that drives the first linear motor 11) based on the phase angle detected by the first magnetic pole sensor 21. Specifically, the magnetic pole converter 31 adds an offset angle in accordance with a distance between the first linear motor 11 and the magnetic pole sensor 21 to the phase angle detected by the first magnetic pole sensor 21, to obtain the electrical angle of the first linear motor 11. The magnetic pole converter 31 supplies the first servo amplifier 50 with the derived electrical angle (magnetic pole) of the first linear motor 11.

Further, the magnetic pole converter 31 derives an electrical angle of the magnetic field of the second linear motor 12 (an electrical angle of a drive current that drives the second linear motor 12) based on the phase angle detected by the third magnetic pole sensor 23. Specifically, the magnetic pole converter 31 adds an offset angle in accordance with a distance between the second linear motor 12 and the third magnetic pole sensor 23 to the phase angle detected by the third magnetic pole sensor 23, to obtain the electrical angle of the second linear motor 12. The magnetic pole converter 31 supplies the second servo amplifier 60 with the derived electrical angle (magnetic pole) of the second linear motor 12.

When the position converter 32 receives a valid state signal (validation) from each of the first and second magnetic pole sensors 21, 22, the position converter 32 supplies the position rate converter 33 with the outputs of the first and second magnetic pole sensors 21, 22. On the other hand, when the position converter 32 receives an invalid state signal (validation) from the first magnetic pole sensor 21 and receives a valid state signal (validation) from each of the second and third magnetic pole sensors 22, 23, the position converter 32 supplies the position rate converter 33 with the outputs of the second and third magnetic pole sensors 22, 23. Further, the position converter 32 supplies the controller 40 with the signals (validations) received from the first, second, and third magnetic pole sensors 21, 22, 23 and indicating the valid/invalid states.

The position rate converter 33 adjusts a position conversion rate for converting the position from the phase angle detected by the second magnetic pole sensor 22 to calculate a corrected position. Specifically, based on a phase difference between the first phase angle detected by the first magnetic pole sensor (first detector) 21 and the second phase angle detected by the second magnetic pole sensor (second detector) 22, the position rate converter 33 adjusts the position conversion rate to calculate a corrected position. Hereinafter, the position rate converter 33 will be more specifically described.

First, the position rate converter 33 functions as the storage unit and previously stores, as a reference phase difference $\Delta X2$, a phase difference between a first phase angle X1org detected by the first magnetic pole sensor 21 and a second phase angle X2org detected by the second magnetic pole sensor 22 at the time when the mobile body 100 is located in the first magnetic pole section (first pitch length=prescribed pitch length) 210.

$$\Delta X2 = X1\text{org} - X2\text{org}$$

Further, the position rate converter 33 functions as the rate changing unit, and calculates a phase difference $\Delta X1$ between a first phase angle X1 detected by the first magnetic pole sensor 21 and a second phase angle X2 detected by the second magnetic pole sensor 22 at the present position (the present magnetic pole section), to calculate a shift amount C between the phase difference $\Delta X1$ and the reference phase difference $\Delta X2$ in this present position (the present magnetic pole section).

$$(X1-X2)-(X1\text{org}-X2\text{org}) = \Delta X1 - \Delta X2 = C$$

Then, the position rate converter 33 calculates a position conversion rate D based on the shift amount C, an initial value (e.g., first pitch length=prescribed pitch length) D0 of the position conversion rate at the time when the mobile body 100 is located in the first magnetic pole section (first pitch length=prescribed pitch length) 210, an offset amount $\beta$, and an adjustment coefficient $\gamma$ of the position conversion rate.

$$D = D0 \times \{(C+\beta) \times \gamma\}$$

Further, the position rate converter 33 functions as the position specifying unit, and calculates corrected position data P' based on the position conversion rate D and the present position data (phase angle X2) P detected by the second magnetic pole sensor 22.

$$P' = P \times D$$

The position rate converter 33 supplies the derived corrected position data P' (position) to the controller 40 and the first and second servo amplifiers 50, 60.

Similarly, based on a phase difference between the first phase angle detected by the third magnetic pole sensor (first detector) 23 and the second phase angle detected by the second magnetic pole sensor (second detector) 22, the position rate converter 33 adjusts the position conversion rate to calculate a corrected position. Hereinafter, the position rate converter 33 will be more specifically described.

First, the position rate converter 33 functions as the storage unit and previously stores, as a reference phase difference $\Delta X2$, a phase difference between a first phase angle X1org detected by the third magnetic pole sensor 23 and a second phase angle X2org detected by the second magnetic pole sensor 22 at the time when the mobile body 100 is located in the first magnetic pole section (first pitch length=prescribed pitch length) 210.

$$\Delta X2 = X1\text{org} - X2\text{org}$$

Further, the position rate converter 33 functions as the rate changing unit, and calculates a phase difference $\Delta X1$ between the first phase angle X1 detected by the third magnetic pole sensor 23 and a second phase angle X2 detected by the second magnetic pole sensor 22 at the present position (the present magnetic pole section), to calculate a shift amount C between the phase difference $\Delta X1$ and the reference phase difference $\Delta X2$ in this present position (the present magnetic pole section).

$$(X1-X2)-(X1\text{org}-X2\text{org}) = \Delta X1 - \Delta X2 = C$$

Then, the position rate converter 33 calculates a position conversion rate D based on the shift amount C, an initial position conversion rate (e.g., first pitch length=prescribed pitch length) D0 at the time when the mobile body 100 is located in the first magnetic pole section (first pitch length=prescribed pitch length) 210, a predetermined offset amount $\beta$, and a predetermined adjustment coefficient $\gamma$ of the position conversion rate.

$$D = D0 \times \{(C+\beta) \times \gamma\}$$

Further, the position rate converter 33 functions as the position specifying unit, and calculates the corrected position data P' based on the position conversion rate D and the present position data (phase angle X2) P detected by the second magnetic pole sensor 22.

$$P' = P \times D$$

The position rate converter 33 supplies the derived corrected position data P' (position) to the controller 40 and the first and second servo amplifiers 50, 60.

In the present embodiment, C takes 0 when the mobile body is located with the prescribed pitch. Further, C takes $-x$ with the prescribed pitch+$\alpha$, and takes +x with the prescribed pitch $-\alpha$. The ranges of +x and $-x$ are determined in accordance with the magnetic pole pitch. Further, $\beta$ and $\gamma$ are determined such that $\{(C+\beta) \times \gamma\} = 1$ holds when C=0. It means that, while C takes symbol $\pm$, $\beta$ only takes symbol +, and the initial position conversion rate is multiplied by a rate being a value $\gamma$.

The position rate converter 33 has been described above. That is, the position rate converter (rate changing unit) 33 takes as a reference the initial position conversion rate D0 corresponding to the first pitch length (prescribed pitch length) of the first magnetic pole section 210 in the magnetic pole path, and calculates the position conversion rate D changed from the initial position conversion rate D0 obtained by associating the phase angles X1org, X2org in the first pitch length with the position of the magnetic pole path. Note that the initial position conversion rate D0 serving as the reference of the position rate converter (rate changing unit) 33 is not limited to the first pitch length of the first magnetic pole section 210. For example, the position rate converter (rate changing unit) 33 may take as a reference the initial position conversion rate D0 corresponding to an intermediate (e.g., 65.5 mm) between the first pitch length (e.g., 66 mm) of the first magnetic pole section 210 and the second pitch length (e.g., 65 mm) of the second magnetic pole section 220 in the magnetic pole path. Note that the one-pitch position is a distance (unit: mm) with a boundary point (phase angle: 0 degrees) of magnetic pole pitches taken as a reference, and the phase angle is a phase difference (unit: digit) with a boundary point (phase angle: 0 degrees) of magnetic pole pitches taken as a reference. For example, the position conversion rate has the relation of: 1 digit=A mm. In this formula, since a pair of magnetic poles, the north pole and the south pole, has 360 degrees on the magnetic pole path, when a digital value (digit) and a physical distance (mm) corresponding to 360 degrees are found, they can be related as described above. Then, the position rate converter (position specifying unit) 33 specifies the position of the mobile body along the magnetic pole path based on the position conversion rate D.

6. Configuration of Controller 40

The controller 40 includes a vehicle controller 41 and a motion controller 43.

The vehicle controller 41 acquires drive control information of the mobile body, such as a target position, a target velocity, and a target stop-distance, from a host controller (not illustrated), and previously stores the information. The vehicle controller 41 supplies these pieces of information to the motion controller 43.

When receiving a valid state signal (validation) of the first magnetic pole sensor 21 from the position converter 32, the motion controller 43 supplies the first servo amplifier 50 with a position command (command position) for reaching a command position based on the corrected position data P' (position) from the position rate converter 33. On the other hand, upon receipt of an invalid state signal (validation) of the first magnetic pole sensor 21 from the position converter 32, the motion controller 43 stops supplying the first servo amplifier 50 with the position command (command position).

Similarly, when receiving a valid state signal (validation) of the third magnetic pole sensor 23 from the position converter 32, the motion controller 43 supplies the second servo amplifier 60 with a position command (command position) for reaching a command position based on the corrected position data P' (position) from the position rate converter 33. On the other hand, upon receipt of an invalid state signal (validation) of the third magnetic pole sensor 23 from the position converter 32, the motion controller 43 stops supplying the second servo amplifier 60 with the position command (command position).

7. First and Second Servo Amplifiers 50, 60

The first servo amplifier 50 has a position controller 51, a velocity controller 52, a current controller 53, subtractors 54A, 54B, 54C, a differentiator 55, an inverter 56, and a current sensor 57.

The position controller 51 receives input of data (position difference data) obtained by the subtractor 54A calculating a difference between the target position indicated by the position command from the motion controller 43 and the present position indicated by the corrected position data P' from the position rate converter 33. The position controller 51 outputs velocity data in accordance with this position difference data.

The velocity controller 52 receives input of data (velocity difference data) obtained by the differentiator 55 differentiating position information from the position rate converter 33 and by the subtractor 54B calculating a difference between this differentiation data and the velocity data from the position controller 51. The velocity controller 52 outputs current value data in accordance with this velocity difference data.

The current controller 53 receives input of data (current value difference data) obtained by the current sensor 57 detecting the present current value of the first linear motor 11 and by the subtractor 54C calculating a difference between the current value data from the velocity controller 52 and feedback data in accordance with the present current value (the actual current value) from the current sensor 57. The current controller 53 outputs a DC drive current in accordance with this current value difference data.

The inverter 56 converts the DC drive current from the current controller 53 to an AC drive current based on the electrical angle of the first linear motor from the magnetic pole converter 31, to generate a drive current for driving the first linear motor. One example of the inverter 56 is a three-phase inverter using an intelligent power module (IPM).

Similarly, the second servo amplifier 60 has a position controller 61, a velocity controller 62, a current controller 63, subtractors 64A, 64B, 64C, a differentiator 65, an inverter 66, and a current sensor 67.

The position controller 61 receives input of data (position difference data) obtained by the subtractor 64A calculating a difference between the target position indicated by the position command from the motion controller 43 and the present position indicated by the corrected position data P' from the position rate converter 33. The position controller 61 outputs velocity data in accordance with this position difference data.

The velocity controller 62 receives input of data (velocity difference data) obtained by the differentiator 65 differentiating position information from the position rate converter 33 and by the subtractor 64B calculating a difference between this differentiation data and the velocity data from the position controller 61. The velocity controller 62 outputs current value data in accordance with this velocity difference data.

The current controller 63 receives input of data (current value difference data) obtained by the current sensor 67 detecting the present current value of the second linear motor 12 and by the subtractor 64C calculating a difference between the current value data from the velocity controller 62 and feedback data in accordance with the present current value (the actual current value) from the current sensor 67. The current controller 63 outputs a DC drive current in accordance with this current value difference data.

The inverter 66 converts the DC drive current from the current controller 63 to an AC drive current based on the electrical angle of the second linear motor from the magnetic pole converter 31, to generate a drive current for driving the second linear motor. One example of the inverter 66 is a three-phase inverter using an intelligent power module (IPM).

8. Operation of Mobile Body System 1 (Mobile Body 100) and Position Detecting Method for the Same Next, a description is given of operation of the mobile body system 1 (mobile body 100) of the present embodiment, and a position detecting method for the same. First, based on signals (validations) received from the first and second magnetic pole sensors 21, 22 and indicating the valid/invalid state, it is determined whether or not the first and second magnetic pole sensors 21, 22 are located in the magnetic pole missing section. When the first and second magnetic pole sensors 21, 22 are not located in the magnetic pole missing section, the first magnetic pole sensor (the detector) 21 detects the first phase angle X1 in the present position (the present magnetic pole section), and the second magnetic pole sensor (the detector) detects the second phase angle X2 in the present position (the present magnetic pole section) (the detection step).

Subsequently, the position rate converter (rate changing unit) 33 calculates a phase difference ΔX1 between the first phase angle X1 and the second phase angle X2 in the present position, and calculates the shift amount C between the phase difference ΔX1 and the reference phase difference ΔX2 in this present position. Here, the reference phase difference ΔX2 is a phase difference between the first phase angle X1org detected by the first magnetic pole sensor 21 and the second phase angle X2org detected by the second magnetic pole sensor 22 at the time when the mobile body 100 is located in the first magnetic pole section (first pitch length=prescribed pitch length) 210. Then, the position rate converter (rate changing unit) 33 calculates a position conversion rate D based on the shift amount C, an initial position conversion rate (e.g., first pitch length=prescribed pitch length) D0 at the time when the mobile body 100 is located in the first magnetic pole section (first pitch length=prescribed pitch length) 210, a predetermined offset amount β, and a predetermined adjustment coefficient γ of the position conversion rate (the rate changing step).

Next, the position rate converter (position specifying unit) 33 calculates corrected position data P' based on the position conversion rate D and the present position data (phase angle X2) P detected by the second magnetic pole sensor 22 (the position specifying step). Subsequently, based on the corrected position data P', the controller 40 and the first servo amplifier 50 drive the first linear motor 11.

On the other hand, when the first magnetic pole sensor 21 is located in the magnetic pole missing section (the invalid state signal), based on signals (validations) received from the second and third magnetic pole sensors 22, 23 and indicating the valid/invalid state, it is determined whether or not the second and third magnetic pole sensors 22, 23 are located in the magnetic pole missing section. When the second and third magnetic pole sensors 22, 23 are not located in the magnetic pole missing section, the third magnetic pole sensor (detector) 23 detects the first phase angle X1 in the present position (the present magnetic pole section), and the second magnetic pole sensor (the detector) detects the second phase angle X2 in the present position (the present magnetic pole section) (the detection step).

Subsequently, the position rate converter (rate changing unit) 33 calculates a phase difference ΔX1 between the first phase angle X1 and the second phase angle X2 in the present position, and calculates the shift amount C between the phase difference ΔX1 and the reference phase difference ΔX2 in this present position. Here, the reference phase difference ΔX2 is a phase difference between the first phase angle X1org detected by the first magnetic pole sensor 21 and the second phase angle X2org detected by the second magnetic pole sensor 22 at the time when the mobile body 100 is located in the first magnetic pole section (first pitch length=prescribed pitch length) 210. Then, the position rate converter (rate changing unit) 33 calculates a position conversion rate D based on the shift amount C, an initial position conversion rate (e.g., first pitch length=prescribed pitch length) D0 at the time when the mobile body 100 is located in the first magnetic pole section (first pitch length=prescribed pitch length) 210, a predetermined offset amount β, and a predetermined adjustment coefficient γ of the position conversion rate (the rate changing step).

Next, the position rate converter (position specifying unit) 33 calculates corrected position data P' based on the position conversion rate D and the present position data (phase angle X2) P detected by the second magnetic pole sensor 22 (the position specifying step). Subsequently, based on the corrected position data P', the controller 40 and the second servo amplifier 60 drive the second linear motor 12.

As described above, according to the mobile body 100, the mobile body system 1, and the position detecting method for the mobile body in the present embodiment, the position conversion rate for specifying the position can be changed based on the phase difference between the first phase angle and the second phase angle actually detected by the two magnetic pole sensors (detection units). It is thereby possible to grasp the change in pitch length of the magnetic pole path with high accuracy, and adjust the position conversion rate with high accuracy. Hence it is possible to detect the position with high accuracy even when the change in pitch length of the magnetic pole path occurs.

Further, according to the mobile body 100, the mobile body system 1, and the position detecting method for the mobile body in the present embodiment, since the comparison is made with the reference phase difference being a fixed value, it is possible to grasp the change in pitch length of the magnetic pole path and adjust the position conversion rate not only in a transition period between the first magnetic pole section and the second magnetic pole section but also during the time of detection by both of the two magnetic pole sensors (detectors) in the first magnetic pole section or the second magnetic pole section.

Further, according to the mobile body 100, the mobile body system 1, and the position detecting method for the mobile body in the present embodiment, the two magnetic pole sensors (detectors) have detection planes with different angles from each other by 90 degrees and include two Hall elements which are disposed in substantially the same position in the magnetic sensor in the path direction of the magnetic pole path. It is thereby possible to hold the Hall elements compactly in the same position such that the detection planes are oriented in a vertical direction and a horizontal direction.

Second Embodiment

The present invention is not limited to the above embodiment, and a variety of modifications are possible. For example, although the position rate converter 33 calculates the successive position conversion rate D and corrected position data P' as in the above formula in the present embodiment, the position rate converter 33 may calculate discrete corrected position data P' as shown below. For example, the position rate converter (rate changing unit) 33 previously stores the discrete position conversion rate D as below.

$D=D1(D<I1)$ $D2(I1 \leq D<I2)$ $D3(I2 \leq D<I3)$ $$D4(I3 \leq D < I4)$$

$$D5(I4 \leq D)$$

I1 to I4: Predetermined thresholds

The position rate converter (position specifying unit) 33 may calculate the corrected position data P' based on the position conversion rate D and the present position data (phase angle X2) P detected by the second magnetic pole sensor 22.

$$P'=P \times D$$

In the second embodiment, the position rate converter (rate changing unit) 33 selects and changes the discrete position conversion rate D=D1, D2, D3, D4, D5 obtained by associating a predetermined phase angle of the magnetic pole path with the position of the magnetic pole path.

Other Embodiments

In the above embodiment, there have been illustrated the modes in which the first and second magnetic pole sensors 21, 22 are respectively the first and second detectors, and in which the third and second magnetic pole sensors 23, 22 are respectively the first and second detectors. However, the first and third magnetic pole sensors 21, 23 may be respectively the first and second detectors. In this case, the position rate converter 33 changes the position conversion rate D based on the phase angles detected by the first and third magnetic pole sensors 21, 23 (the two electrical angle detecting sensors), and specifies the position of the mobile body based on this position conversion rate D and the present position data P detected by the second magnetic pole sensor (position detecting sensor) 22.

Further, in the above embodiment, the phase angle detected by the magnetic pole sensor has been taken as the position information (position), but the displacement amount of the phase angle detected by the magnetic pole sensor may be taken as the position information (position). For example, a displacement amount of the phase angle from an arbitrary reference position, namely, a movement amount, may be taken as the position information (position). More specifically, the position converter 32 may regularly acquire a phase angle detected by the magnetic pole sensor and calculate a displacement amount of the phase angle, and the position rate converter 33 may convert the calculated displacement amount of the phase angle with the position conversion rate and output the converted displacement amount (movement amount) to the controller 40 and the servo amplifiers 50, 60 as position information (position). Note that the reference position may be a movement start position of the mobile body, or may be coordinate information acquired by reading a barcode discretely disposed on a rail by using a reader provided in the mobile body.

In this case, the controller 40 and the servo amplifiers 50, 60 use, as the present position information (position), the displacement amount of the phase angle from the arbitrary reference position, namely, the movement amount. Specifically, the motion controller 43 supplies the servo amplifiers 50, 60 with information indicating the movement amount as a position command (command position). The servo amplifiers 50, 60 generate a drive current for driving the linear motor from the target position indicated by the position command from the motion controller 43, the present position indicated by the movement amount as the position information from the position rate converter 33, and feedback data in accordance with the actual current value of the linear motor, detected by the current sensor.

Figure 9:
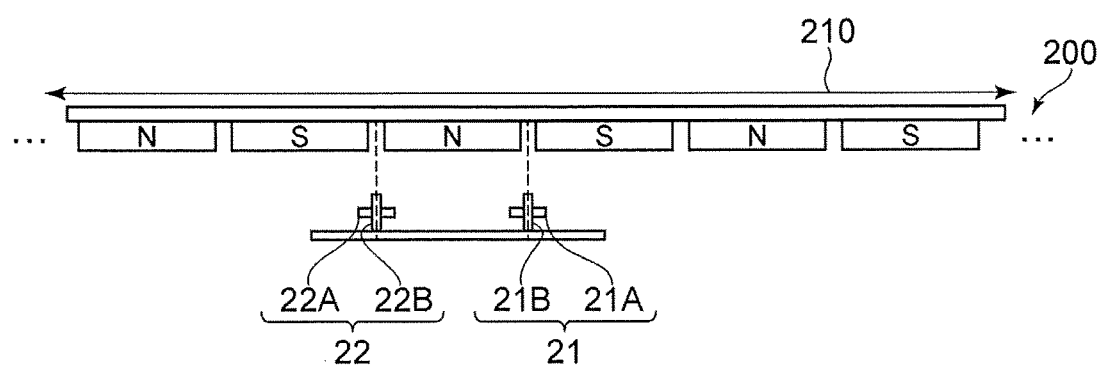
FIG. 9 is a diagram illustrating a magnetic pole sensor according to an alternative embodiment of the present invention.

Further, in the above embodiment, the mode has been illustrated in which the first detector and the second detector are configured as different magnetic sensors from each other, but a mode may be adopted in which the first detector and the second detector are configured as the same magnetic sensor. That is, in the above embodiment, as illustrated in FIG. 4, the first, second, and third magnetic pole sensors 21, 22, 23 respectively include two Hall elements 21A, 21B, 22A, 22B, 23A, 23B having detection planes with different angles from each other by 90 degrees. However, as illustrated in FIG. 9, the first and third magnetic pole sensors 21, 23 may include two Hall elements (first detectors) 21A, 21B having detection planes with different angles from each other by 90 degrees and include two Hall elements (second detectors) 22A, 22B having detection planes with different angles from each other by 90 degrees, and the Hall elements 21A, 21B and the Hall elements 22A, 22B may be offset with respect to the path direction of the magnetic pole path. In this case, the position rate converter 33 adjusts the position conversion rate based on a phase difference between the first phase angle detected by the Hall elements (first detectors) 21A, 21B and the second phase angle detected by the Hall elements (second detectors) 22A, 22B in the same magnetic sensor, to calculate a corrected position. Accordingly, by using one magnetic sensor, the change in pitch length of the magnetic pole path can be grasped, to adjust the position conversion rate.

Further, in the above embodiment, as illustrated in FIG. 4, the first, second, and third magnetic pole sensors 21, 22, 23 respectively include two Hall elements 21A, 21B, 22A, 22B, 23A, 23B having detection planes with different angles from each other by 90 degrees. However, instead of shifting the detection planes by 90 degrees, each of the first, second, and third magnetic pole sensors 21, 22, 23 may be disposed so as to be shifted by a quarter pitch (90 degrees) in the path direction of the magnetic pole path, as illustrated in FIG. 8.

Further, in the above embodiment, the mode has been illustrated in which the position rate converter (the rate changing unit) changes the position conversion rate based on the phase difference between the first phase angle detected by the first or third magnetic pole sensor (detector) 21 or 23 and the second phase angle detected by the second magnetic pole sensor (detector) 22. However, the position rate converter (the rate changing unit) may change the position conversion rate based on a difference between a displacement amount of the first phase angle detected by the first or third magnetic pole sensor (detector) 21 or 23 (a displacement amount of the first phase angle in different positions/time) and a displacement amount of the second phase angle detected by the second magnetic pole sensor (detector) 22 (a displacement amount of the second phase angle in different positions/time) (corresponding to claim 9). Thus, it is possible to grasp the change in pitch length of the magnetic pole path and adjust the position conversion rate in the transition period between the first magnetic pole section and the second magnetic pole section without previously storing the reference phase difference.

Further, in the above embodiment, the mode has been illustrated in which the position rate converter (the rate changing unit) changes the position conversion rate based on the two phase angles detected by the two magnetic pole sensors (detectors). However, the position rate converter (the rate changing unit) may change the position conversion rate based on one phase angle detected by the one magnetic pole sensor (detector). For example, when a phase angle detected by the detector is shifted from a reference phase angle (e.g., initial value a+mobile body velocity v×movement time t) held as a system, the position rate converter may determine that the pitch length of the magnetic pole path has changed and change the position conversion rate. Moreover, for example, the position rate converter may previously store one phase angle detected by the detector in a time series manner, and when a phase angle detected at present is deviated from its history, the position rate converter may determine that the pitch length of the magnetic pole path has changed, and change the position conversion rate.

Further, a sensor for detecting an element different from the element detected by the magnetic sensor may be used as the detector. For example, a velocity sensor may be mounted in the mobile body mounted with the magnetic pole sensor. A velocity is calculated by differentiating a position generated from the output value of the magnetic pole sensor. At a magnet pitch different from the prescribed pitch, a conversion rate for the position is different, and hence the velocity generated from the magnetic pole sensor is different from an actual velocity of the vehicle outputted from the velocity sensor. By using this difference, the position conversion rate of the magnetic pole sensor can be adjusted to output a corrected position. Moreover, for example, a reading device such as a barcode reader or an RFID reader may be mounted in the mobile body mounted with the magnetic pole sensor. In this case, a reading object added with information of the magnetic pole pitch is fitted to the magnetic pole path. By using the information of the magnetic pole pitch acquired from the reading device, the position conversion rate can be adjusted in the magnetic pole sensor, to output a corrected position.

Moreover, although the mobile body having two linear motors has been illustrated in the above embodiment, the mobile body may have three or more linear motors.

In the above embodiment, the mobile body that moves along the magnetic pole path having the magnetic pole missing section has been illustrated. However, the characteristics of the present invention are also applicable to a mobile body that moves along a magnetic pole path without a magnetic pole missing section. In this case, the mobile body may include only one linear motor.

Further, in the above embodiment, the mobile body including the linear motor has been illustrated, but the characteristics of the present invention are also applicable to a mobile body including a rotary motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A mobile body that moves along a magnetic pole path including a first magnetic pole section in which a plurality of pairs of magnetic poles, each including a north pole and a south pole, are arranged with a first pitch length, and a second magnetic pole section in which a plurality of pairs of magnetic poles, each including a north pole and a south pole, are arranged with a second pitch length that is different from the first pitch length, the mobile body comprising:
 a detector for detecting a phase angle in accordance with a magnetic flux of the magnetic pole path;
 a rate changing unit for changing a position conversion rate obtained by associating a phase angle of the magnetic pole path with a position of the magnetic pole path based on the phase angle detected by the detector; and
 a position specifying unit for specifying a position of the mobile body along the magnetic pole path based on the phase angle detected by the detector and the position conversion rate changed by the rate changing unit.

2. The mobile body according to claim 1, wherein the detector includes
 a first detector which detects a first phase angle in accordance with the magnetic flux of the magnetic pole path, and
 a second detector which is disposed in a position different from a position of the first detector in a path direction of the magnetic pole path and detects a second phase angle in accordance with the magnetic flux of the magnetic pole path, and wherein
 the rate changing unit changes the position conversion rate based on a phase difference between the first phase angle and the second phase angle.

3. The mobile body according to claim 2, wherein the first detector includes at least two magnetic elements and detects the first phase angle based on the at least two magnetic elements, and
 the second detector includes at least two magnetic elements and detects the second phase angle based on the at least two magnetic elements.

4. The mobile body according to claim 2, wherein the first detector and the second detector are configured as different magnetic sensors from each other.

5. The mobile body according to claim 4, wherein the first detector includes a first magnetic element and a second magnetic element which have detection planes with different angles from each other by 90 degrees, and are disposed in substantially the same position in the magnetic sensor in the path direction of the magnetic pole path, and
 the second detector includes a third magnetic element and a fourth magnetic element which have detection planes with different angles from each other by 90 degrees, and are disposed in substantially the same position in the magnetic sensor in the path direction of the magnetic pole path.

6. The mobile body according to claim 2, wherein the first detector and the second detector are configured as the same magnetic sensor.

7. The mobile body according to claim 2, further comprising
 a storage unit for previously storing a reference phase difference,
 wherein the rate changing unit changes the position conversion rate based on an amount of shift between the reference phase difference and the phase difference of the first phase angle and the second phase angle.

8. The mobile body according to claim 7, wherein the reference phase difference is a phase difference between phase angles detected respectively by the first detector and the second detector in the first magnetic pole section.

9. The mobile body according to claim 2, wherein the rate changing unit changes the position conversion rate based on a difference between a displacement amount of the first phase angle and a displacement amount of the second phase angle.

10. A mobile body system comprising:
 a magnetic pole path including a first magnetic pole section in which a plurality of pairs of magnetic poles, each including a north pole and a south pole, are arranged with a first pitch length, and a second magnetic pole section in which a plurality of pairs of magnetic poles, each including a north pole and a south pole, are arranged with a second pitch length that is different from the first pitch length;

a mobile body which moves along the magnetic pole path;

a detector which is provided in the mobile body and detects a phase angle in accordance with a magnetic flux of the magnetic pole path;

a rate changing unit for changing a position conversion rate obtained by associating a phase angle of the magnetic pole path with a position of the magnetic pole path based on the phase angle detected by the detector; and a position specifying unit for specifying a position of the mobile body along the magnetic pole path based on the phase angle detected by the detector and the position conversion rate changed by the rate changing unit.

11. The mobile body system according to claim 10, wherein the detector includes a first detector which detects a first phase angle in accordance with the magnetic flux of the magnetic pole path, and a second detector which is disposed in a position different from a position of the first detector in a path direction of the magnetic pole path and detects a second phase angle in accordance with the magnetic flux of the magnetic pole path, and wherein the rate changing unit changes the position conversion rate based on a phase difference between the first phase angle and the second phase angle.

12. The mobile body system according to claim 11, wherein the first detector includes at least two magnetic elements and detects the first phase angle based on the at least two magnetic elements, and the second detector includes at least two magnetic elements and detects the second phase angle based on the at least two magnetic elements.

13. The mobile body system according to claim 11, wherein the first detector and the second detector are configured as different magnetic sensors from each other.

14. The mobile body system according to claim 13, wherein the first detector includes a first magnetic element and a second magnetic element which have detection planes with different angles from each other by 90 degrees, and are disposed in substantially the same position in the magnetic sensor in the path direction of the magnetic pole path, and the second detector includes a third magnetic element and a fourth magnetic element which have detection planes with different angles from each other by 90 degrees, and are disposed in substantially the same position in the magnetic sensor in the path direction of the magnetic pole path.

15. The mobile body system according to claim 11, wherein the first detector and the second detector are configured as the same magnetic sensor.

16. The mobile body system according to claim 11, further comprising a storage unit for previously storing a reference phase difference, wherein the rate changing unit changes the position conversion rate based on an amount of shift between the reference phase difference and the phase difference of the first phase angle and the second phase angle.

17. The mobile body system according to claim 16, wherein the reference phase difference is a phase difference between phase angles detected respectively by the first detector and the second detector in the first magnetic pole section.

18. The mobile body system according to claim 11, wherein the rate changing unit changes the position conversion rate based on a difference between a displacement amount of the first phase angle and a displacement amount of the second phase angle.

19. A position detecting method for a mobile body that moves along a magnetic pole path including a first magnetic pole section in which a plurality of pairs of magnetic poles, each including a north pole and a south pole, are arranged with a first pitch length, and a second magnetic pole section in which a plurality of pairs of magnetic poles, each including a north pole and a south pole, are arranged with a second pitch length that is different from the first pitch length, the method comprising:

a detection step of detecting a phase angle in accordance with a magnetic flux of the magnetic pole path;

a rate changing step of changing a position conversion rate obtained by associating a phase angle of the magnetic pole path with a position of the magnetic pole path based on the phase angle detected in the detection step; and a position specifying step of specifying a position of the mobile body along the magnetic pole path based on the phase angle detected in the detection step and the position conversion rate changed in the rate changing step.

* * * * *